United States Patent
Naber

(10) Patent No.: US 10,634,383 B2
(45) Date of Patent: Apr. 28, 2020

(54) EXHAUST AIR CHANNEL ARRANGEMENT FOR A KITCHEN EXHAUST AIR CHANNEL SYSTEM

(71) Applicant: Naber Holding GmbH & Co. KG, Nordhorn (DE)

(72) Inventor: Hans-Joachim Naber, Nordhorn (DE)

(73) Assignee: NABER HOLDING GMBH & CO. KG, Nordhorn (DE)

( * ) Notice: Subject to any disclaimer, the term of this patent is extended or adjusted under 35 U.S.C. 154(b) by 216 days.

(21) Appl. No.: 15/957,049

(22) Filed: Apr. 19, 2018

(65) Prior Publication Data
US 2018/0328617 A1   Nov. 15, 2018

(30) Foreign Application Priority Data
May 9, 2017   (DE) .................... 20 2017 102 758 U

(51) Int. Cl.
| | |
|---|---|
| *F24F 13/02* | (2006.01) |
| *F16L 9/22* | (2006.01) |
| *F16L 9/00* | (2006.01) |
| *F16L 9/16* | (2006.01) |
| *F24F 7/00* | (2006.01) |

(52) U.S. Cl.
CPC .............. *F24F 13/02* (2013.01); *F16L 9/003* (2013.01); *F16L 9/16* (2013.01); *F16L 9/22* (2013.01); *F24F 13/0245* (2013.01); *F24F 2007/001* (2013.01)

(58) Field of Classification Search
CPC ............ F24F 13/02; F16L 9/003; F16L 9/165

USPC ............................ 138/172, DIG. 4, 177, 116
See application file for complete search history.

(56) References Cited

U.S. PATENT DOCUMENTS

| | | | |
|---|---|---|---|
| 2,180,644 A | 11/1939 | Peck | |
| 4,044,581 A * | 8/1977 | Meserole | B21D 15/04 72/68 |
| 4,249,578 A * | 2/1981 | Freeman | F16L 9/003 138/172 |
| 6,116,833 A * | 9/2000 | Ellis | F24F 13/02 138/172 |
| 6,901,969 B2 * | 6/2005 | Siiter | F24F 13/02 138/172 |
| 2013/0074974 A1 * | 3/2013 | Murchie | F16L 9/04 138/172 |
| 2016/0131389 A1 * | 5/2016 | Lanciaux | F24F 13/02 138/172 |

FOREIGN PATENT DOCUMENTS

| | | | |
|---|---|---|---|
| DE | 102007034595 B3 | 3/2009 | |
| DE | 202017105556 U1 * | 9/2017 | .......... F24F 13/0245 |
| JP | 2009121699 A | 6/2009 | |
| KR | 20120055214 A | 5/2012 | |

* cited by examiner

*Primary Examiner* — Patrick F Brinson
(74) *Attorney, Agent, or Firm* — Marshall & Melhorn, LLC

(57) ABSTRACT

An exhaust air channel arrangement for a kitchen exhaust air channel system is provided in which the exhaust air channel arrangement is composed of a sheet metal pipe and a supporting structure, which is movably received within the sheet metal pipe along the longitudinal direction (x) of the sheet metal pipe, wherein both opposed wall portions of the sheet metal pipe are mutually supported by the supporting structure.

20 Claims, 5 Drawing Sheets

EXHAUST AIR CHANNEL ARRANGEMENT FOR A KITCHEN EXHAUST AIR CHANNEL SYSTEM

BACKGROUND OF THE INVENTION

The present invention is based on an exhaust air channel arrangement for a kitchen exhaust air channel system. Such an exhaust air channel arrangement is known, for example, from JP 4989426 B2. Similar exhaust air channel arrangements are described in U.S. Pat. No. 2,180,644 A, DE 10 2007 034 595 B3 and KR 10-2012-0055214 A.

In particular, in order to fulfill fire protection requirements, in exhaust air channel arrangements of this type, it is frequently desired that these are not configured as plastic material channel systems, as in the state of the art, but are made of metal. In order to reduce as much as possible the higher costs of metal sheet channel systems with respect to plastic channel systems, it is an object to reduce as much as possible the sheet thicknesses of blank materials, from which the individual components of the exhaust air channel arrangement are made. This, however, is limited by the fact that the exhaust air channel arrangement is required to have a certain minimum mechanical strength, on one hand in order to ensure a fluidic durable sealed connection of the individual components at the connection points, and, on the other hand, to allow the exhaust air channel arrangement to also have a certain tread resistance, for example when it has to be mounted inside or on the floor of a building. To this end, in the above cited state of the art, it is known, for example, to provide the outer walls of individual tubular sections of the exhaust air channel arrangement with reinforcement ribs. However, in order for these reinforcement ribs, which are directly provided in the outer wall of the exhaust air channel arrangement, to have the desired stiffening action, it is in turn required, that the wall thickness of the exhaust air channel arrangement exceeds a certain minimum thickness.

SUMMARY OF THE INVENTION

The object of the invention is thus to propose an exhaust air channel arrangement of above said type, which has very small wall thicknesses and a high mechanical strength.

This object is achieved by an exhaust air channel arrangement having the characteristics of claim 1. The dependent claims respectively refer to advantageous embodiments of the invention.

Correspondingly, it is proposed, that the exhaust air channel arrangement is made of a sheet metal pipe and a supporting structure movingly received within the sheet metal pipe along the longitudinal direction of the sheet metal pipe. The supporting structure supports two opposed wall portions of the sheet metal pipe.

The supporting structure may in particular be adapted to be introduced into the sheet metal pipe only if required, for example if particularly high stresses acting on the sheet metal pipe are to be expected. This may occur, for example, when the exhaust air channel arrangement has to be mounted on or within the floor, for example by casting it into the screed. The supporting structure may in particular be a component separate from the sheet metal pipe. This allows the supporting structure to be adapted to the level of required reinforcement of the sheet metal pipe, or that from a plurality of supporting structures having different reinforcement effects, a suitable structure is respectively selected. To this end, the material thickness of the supporting structure and/or the geometry of the supporting structure may be adapted, for example, to the existing stress requirements.

One or more supporting structures may also be introduced, if required, into the sheet metal pipe of the exhaust air channel arrangement. If a plurality of supporting structures is received inside the sheet metal pipe, these may be positioned at a mutual distance. The supporting structure may have a geometry in the plane perpendicular to the longitudinal direction of the sheet metal pipe, which reproduces an inner geometry of the sheet metal pipe, so that the supporting structure contacts the inner periphery of the sheet metal pipe essentially with a form-fit along its outer circumference. When the supporting structure is additionally made of a thin metal sheet, it only causes, in conventional pipe cross-sections, a very small restriction of the pipe cross-section and thus a corresponding small pressure loss.

The supporting structure may in particular be a formed integral metal sheet stripe, thus being economical to manufacture.

The supporting structure may be provided with a first and second contact portion, which respectively contact the inner circumference of the sheet metal pipe through a form-fit.

The first and second contact portion may have a respective C-shape, wherein both contact portions contact two further opposed wall portions on the inner circumference of the sheet metal pipe.

The contact portions may be connected to each other by a Z-shaped portion, wherein the Z-shaped portion has a first and second connection profile side. The first connection profile side may be joined to the first contact portion and the second connection profile side may be joined to the second contact portion.

The connection profile sides may at least in portions contact two opposed wall portions of the sheet metal pipe and may extend to this end at least in portions in parallel to these wall portions.

The supporting structure may thus have a geometry, which is adapted for doubling the inner circumference of the sheet metal pipe over a substantial portion and thus correspondingly increase the mechanical strength of the sheet metal pipe.

The Z-shaped portion may have a central web, through which the first and second connection profile sides are connected to opposed ends of the central web under a respective right angle.

When the Z-shaped portions has a central web, this web may extend perpendicularly to the opposed wall portions of the sheet metal pipe, reaching the same, so that the opposed wall portions of the sheet metal pipe are supported against each other by the central web.

The sheet metal pipe may be formed by a flat channel having an essentially rectangular cross-section, in which the opposed wall portions, which are mutually supported by means of the supporting structure, are a first pair of parallel separated wall portions, and in which two further opposed wall portions are a second pair of parallel separated wall portions, which extend perpendicularly to the first pair of wall portions.

As previously described, at least one supporting structure may be received inside the sheet metal pipe, wherein in case of longer pipe portions, such as sheet metal pipes, which are 1 meter or longer, it is convenient, for flow-connected reasons, to provide a plurality of individual supporting structures instead of a continuous or integral supporting structure, which extends over a substantial or the entire length of the channel, wherein these individual supporting structures are positioned inside the sheet metal channel in a spaced apart manner. Correspondingly, a first and a second supporting structure may be positioned within the sheet metal pipe in a spaced apart manner, wherein the first and second supporting structure subdivide a pipe cross-section into a first partial cross-section and a second partial cross-section, fluidically separated from the first, and wherein, in an interspace between both supporting structures, the pipe cross-section is unitary.

The previously described central web of the supporting structure may for example cause the pipe cross-section to be subdivided, in the area of the supporting structure, by the central web, into both fluidically partial cross-sections, which are separated from each other. Since, in particular, in case of straight pipe portions, this separation is fluid-dynamically disadvantageous and may cause pressure losses due to the stronger wall friction, the interspace between sequential supporting structures is used for joining the partial air flows and thus for causing a reduction of the total pressure loss of the pipe portion reinforced by the supporting structures. The supporting structures may be made of thin sheet metal, so that the possible flow separations on the front sides of the supporting structure may be neglected due to the very small material thickness of the supporting structure.

The supporting structure may be housed inside the sheet metal pipe by mechanical preload. The preload may be directed, to this end, in parallel to both opposed and mutually supported wall portions as well as perpendicularly to the longitudinal direction of the sheet metal pipe. To this end, the supporting structure may be provided, for example, with a cross-sectional geometry, which is perpendicular to its longitudinal direction, provided essentially with an S-shape. The S-shape may be formed, for example, by two C-shaped contact portions, which are connected to each other by a Z-shaped portion.

In order to facilitate the mounting of the supporting structures inside the sheet metal pipe, the supporting structure may be provided, on its outer circumference, with a smooth surface, at least on the part of the same which contacts the inner circumference of the sheet metal pipe. This allows the supporting structure to be comfortably inserted over opposed front sides of the sheet metal pipe.

The exhaust air channel arrangement may be provided, in particular, by casting in the screed of a floor. The exhaust air channel arrangement may thus be arranged in the screed in such a way that a central web of the supporting structure, which supports against each other the opposed wall portions of the sheet metal pipe, is perpendicular to a tread surface of the floor.

The inventive exhaust air channel arrangement in particular allows the sheet metal pipe to be manufactured with a thin metal sheet. The thickness of the thin metal sheet may be less than 0.5 mm, preferably even less than 0.4 mm and preferably less than 0.3 mm. Fundamentally, it is also possible that the sheet metal pipe and the supporting structure are made with a thicker sheet metal, such as one having a thickness of 0.8 mm. Depending on the application, however, in the case of a sheet metal pipe having a thickness of 0.8 mm, and more, the use of a supporting structure may be omitted, or the structure may be lightweight.

The use of thin metal sheet has, on the other hand, the drawback, that in case of a shortening of the sheet metal pipe, sharp cutting edges are formed, which may cause injuries. In order to reduce the risk of injuries on the sharp cutting edges of the sheet metal pipe, when the sheet metal pipe is provided, on the front side of at least one of its opposed ends, with a sharp cutting edge, this cutting edge is covered by a mounting sealing which is inserted over the sharp cutting edge on the at least one end of the sheet metal pipe. The mounting sealing may have a U-shaped cross-section. Moreover, the mounting sealing may have at least one enveloping sealing lip on its inner circumference. In one embodiment, the mounting sealing may seal a female connection with respect to an element with a male connection.

BRIEF DESCRIPTION OF THE DRAWINGS

Further details of the invention are explained with reference to the following figures. In particular.

DETAILED DESCRIPTION OF THE INVENTION

Figure 1:
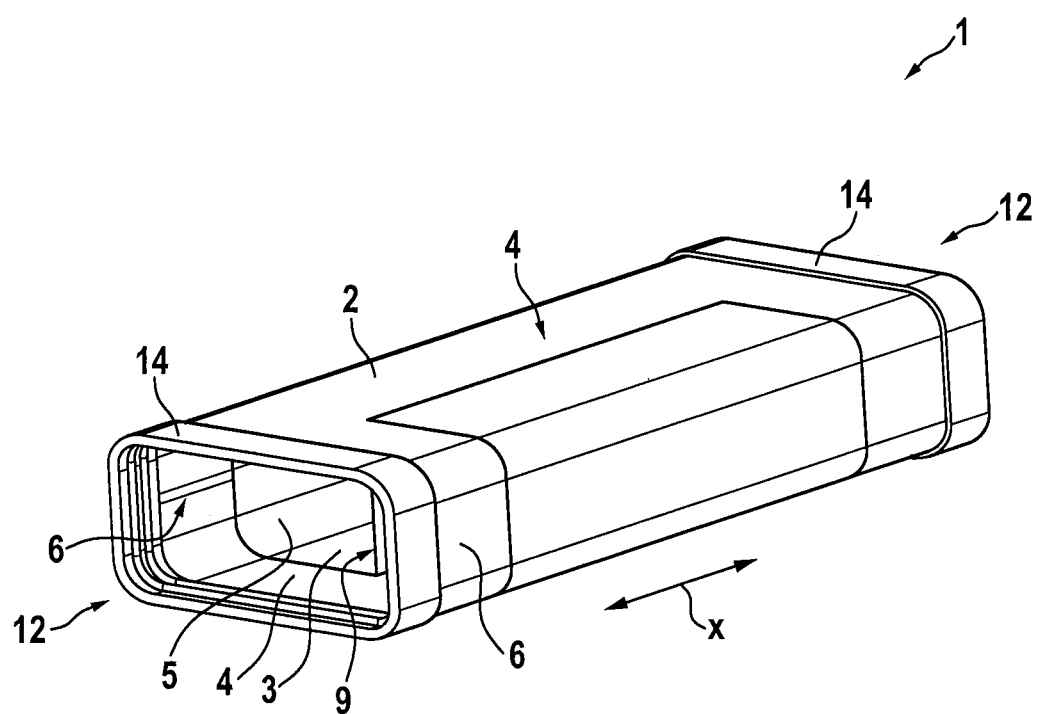
FIG. 1 shows a perspective view of a first embodiment of an exhaust air channel arrangement.

FIG. 1 shows an exemplary embodiment of an inventive exhaust air channel arrangement 1, as used in kitchen exhaust air channel systems, for example.

The exhaust air channel arrangement 1 may in particular be entirely made of metal, in particular sheet metal, except for its mounting sealing's 14, which are inserted over the opposed ends, and thus fulfils the highest requirements regarding fire protection.

The sheet metal pipe 2 may be made of thin sheet metal, wherein the supporting structure 3 housed within the sheet metal pipe 2 provides the same with an additional mechanical strength, so that the exhaust air channel arrangement shown reaches at least the mechanical strength of plastic channel arrangements known in the state of the art.

The supporting structure 3 may also be a formed sheet metal, so that this too may be manufactured, at low costs, and only by bending and folding of thin metal sheets. The supporting structure is a component separate from the sheet metal pipe 2, which may be inserted, if required, over one of the front sides 12 of the sheet metal pipe 2 into the same sheet metal pipe 2. Depending on application, the supporting structure may also be joined to the sheet metal pipe, after reaching an end position within the sheet metal pipe, for example by gluing or welding.

Since it is fundamentally desirable that the supporting structure 3 contacts, over substantial portions of its outer circumference, with a form-fit, the inner circumference of the sheet metal pipe 2, it may be required for mounting the supporting structure 3 inside the sheet metal pipe 2, that the mounting sealing 14 on one of the ends of the sheet metal pipe 2 is removed for mounting, or is inserted on the front side 12 only after insertion of the supporting structure 3. The supporting structure 3 is preferably held inside the sheet metal pipe 2 in a movable manner and in particular only by friction-fit, which is provided by mechanical preloading of the supporting structure 3, through which the supporting structure 3 is pressed against the inner circumference of the sheet metal pipe 2. To this end, the supporting structure 3 may for example be provided with the S-shape shown in FIGS. 1 to 3.

Figure 2:
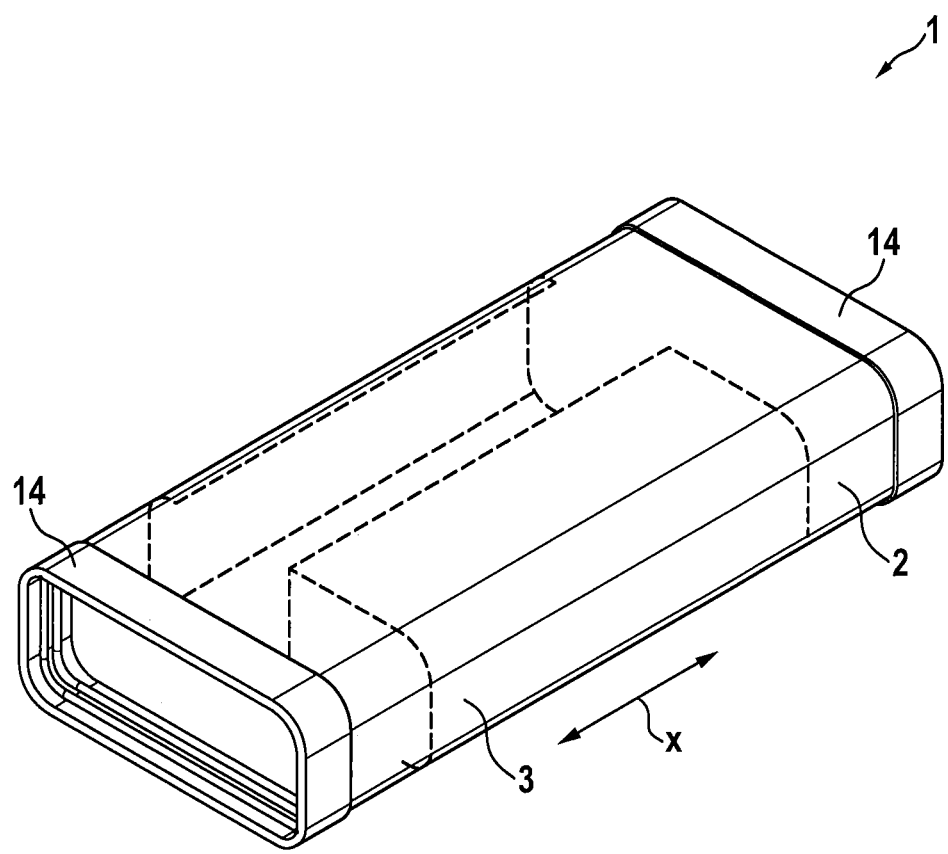
FIG. 2 shows the exhaust air channel arrangement of FIG. 1 in a partially transparent view.
Figure 3:
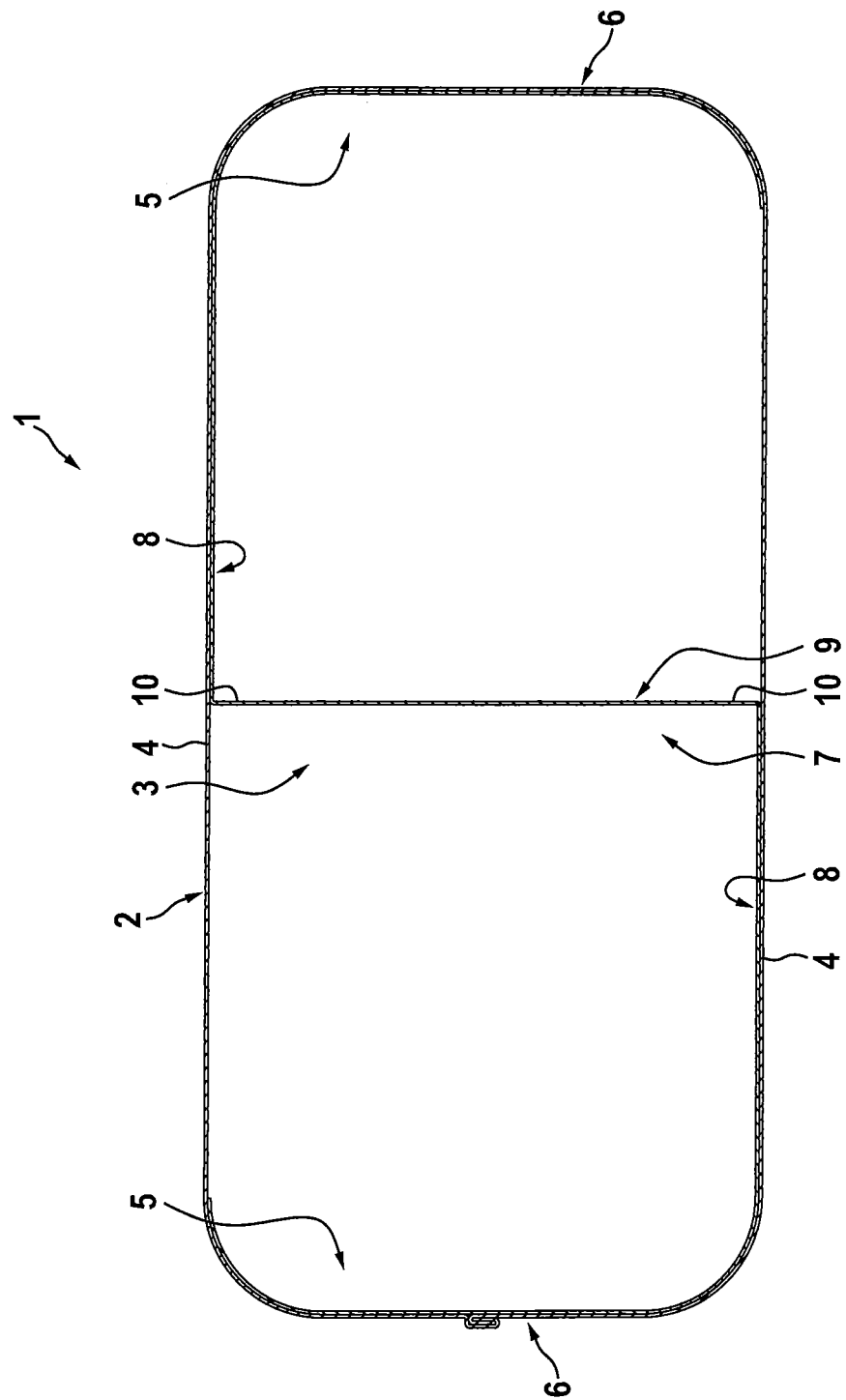
FIG. 3 shows the exhaust air channel arrangement of FIG. 1 in a cross-section perpendicular to the longitudinal direction.

Further details of the supporting structure and of its contact inside the sheet metal pipe 2 are shown in FIGS. 2 and 3. The supporting structure shown is in particular provided with a first and second contact portion 5, through which the supporting structure contacts the inner circumference of sheet metal pipe 2 by form-fit. The first and second contact portion 5 respectively have a C-shape, wherein the contact portions 5 contact with their C shape both opposed wall portions 6 on the inner circumference of sheet metal pipe 2.

Both wall portions 6 extend essentially perpendicularly to both wall portions 4 of sheet metal pipe 2 which are mutually supported by the supporting structure.

The supporting structure 3 also has a Z-shaped portion 7, through which both contact portions 5 are connected to each other. The Z-shaped portion 7 has a first and second connection profile side 8, with which the Z-shaped portion 7 contacts both opposed mutually supported wall portions of sheet metal pipe 2. A first of the connection profile sides 8 is joined to a first of the contact portions 5 and a second of the connection profile sides 8 is joined to a second of contact portions 5, so that both C-shaped contact portions 5 form, with the Z-shaped portion 7, the S-shape, which is shown, in particular, in FIG. 3.

The Z-shaped portion 7 has a central web 9, which extends perpendicularly to the opposed and mutually supported wall portions 4 of sheet metal pipe 2 and reaches the same, so that the inventive support of the opposed wall portions 4 of sheet metal pipe 2 in the embodiment shown in FIG. 3 is effectively provided, in particular by the central web 9.

As fundamentally known from the state of the art, the flat channel has a rectangular cross-section perpendicular to the longitudinal direction, with rounded edges between respective perpendicularly arranged wall portions 4, 6. The flat channel thus has two pairs of two parallel wall portions 4, 6, respectively, wherein the wall portions 4 of a first pair of wall portions 4 are perpendicular to wall portions 6 of a second pair.

Figure 4:
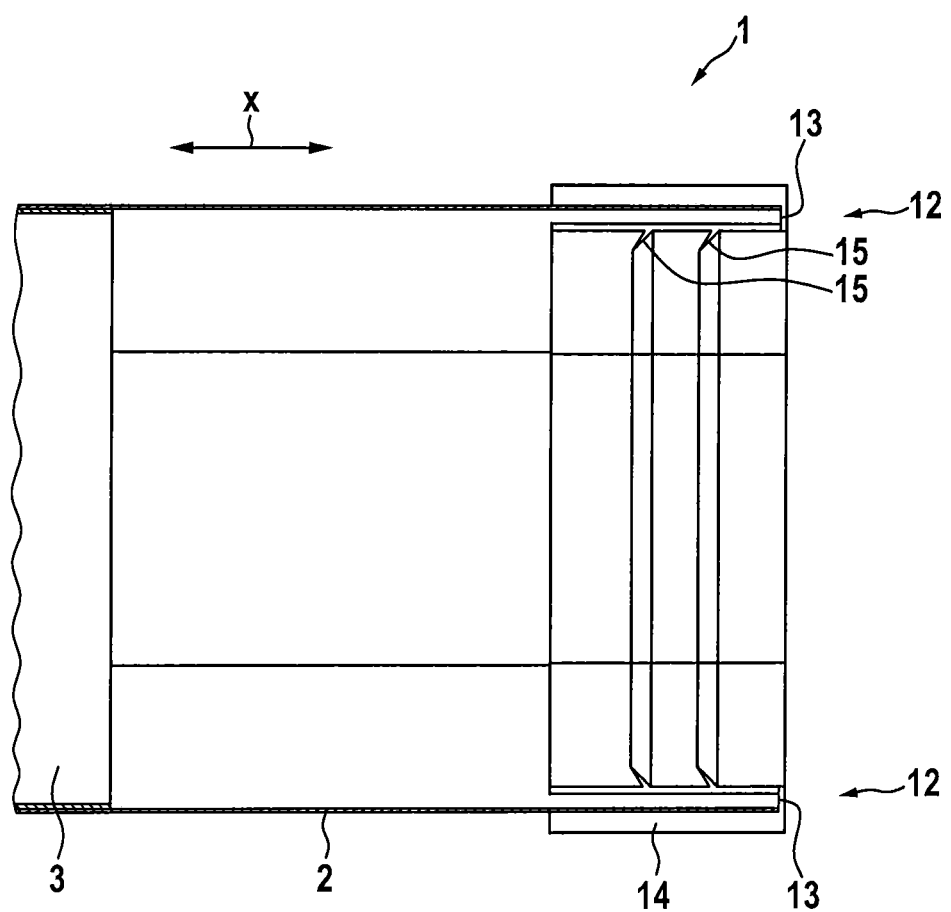
FIG. 4 shows a detailed view of the end of a further embodiment of an exhaust air channel arrangement in a cross-section, in parallel to the longitudinal direction.

As already said, the inventive exhaust air channel arrangement allows in particular the sheet metal pipe 2 to be manufactured with thin sheet metal, which however has the drawback, that in particular in case of shortening of the sheet metal pipe, as usual when mounting inventive an exhaust air channel arrangement, sharp cutting edges may be formed. In order to minimize the risk of injuries, in the embodiment of FIG. 4 the sharp cutting edges 13 are covered on the front sides 12 of sheet metal pipe 2 by a mounting sealing 14. The mounting sealing 14 is also provided as a female adapter, having sealing lips 15 on the inner circumference of the mounting sealing 14.

Figure 5:
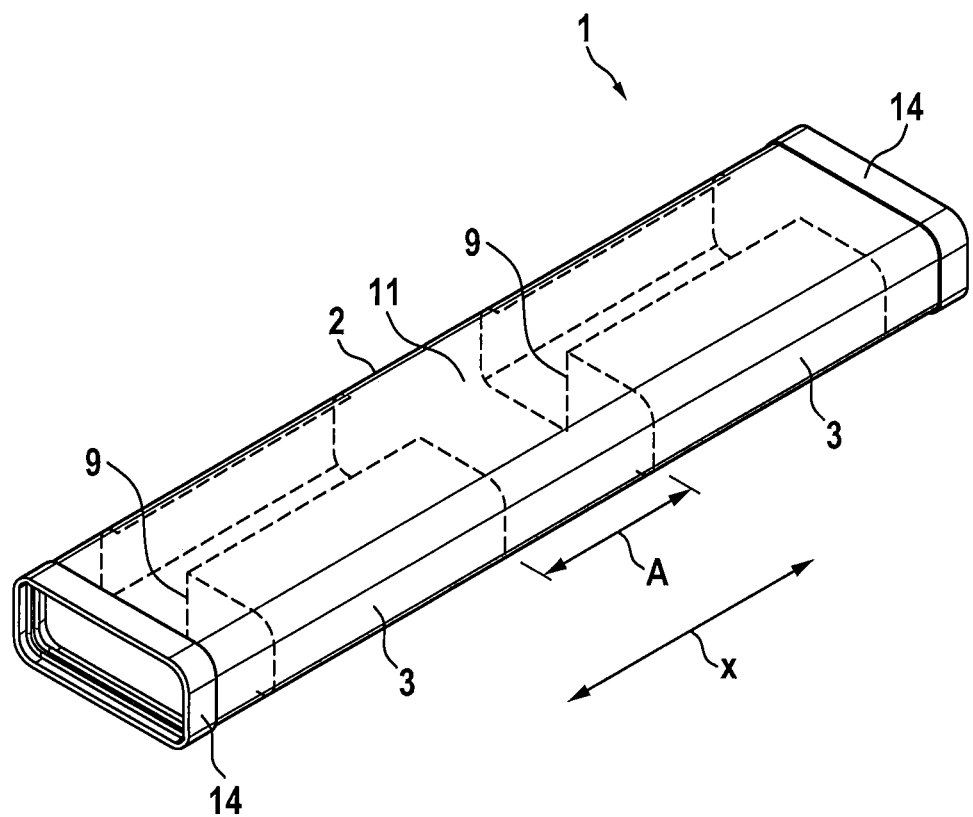
FIG. 5 shows a further embodiment of an inventive exhaust air channel arrangement.

As shown in FIG. 5, in particular in an embodiment of the exhaust air channel arrangement, in which the sheet metal pipe 2 has a certain length, such as one meter, it may be foreseen, that inside the sheet metal pipe 2 a plurality of supporting structures 3 are arranged at a distance A from each other. The use of a plurality of individual supporting structures 3 in case of longer sheet metal pipes 2 has, with respect to the use of single unitary and correspondingly longer supporting structures 3, not only the advantage of an easier mounting within the sheet metal pipe 2, but also fluid-dynamical advantages:

As may be easily demonstrated, the use of the supporting structure 3 with its central web 9 causes the volumetric flow of air flowing into the sheet metal pipe 2 to be subdivided into two partial volumetric flows, which is a drawback, in case of straight pipe portions, due to the higher wall friction with respect to unitary pipe cross-sections, in particular because of a higher pressure loss. In order to reduce this drawback, in the embodiment shown in FIG. 5, it is thus foreseen that the successive supporting structures 3 are separated from each other by a distance A, so that an interspace 11 is formed between both supporting structures, in that the pipe cross-section is unitary, corresponding, in an unlimited way, to the inner cross-section of the sheet metal pipe 2. The interspace 11 may be used for allowing the volumetric flow of air separated by the supporting structure 3, preceding in the direction of air flow, to be again mixed, whereby the total pressure loss of the exhaust air channel arrangement 1 is reduced with respect to unitary and continuous supporting structures 3.

The characteristics of the invention which are disclosed in the preceding description, in the drawings and in the claims may be essential for the implementation of the invention, both individually and in any desired combination.

REFERENCE LIST 1 exhaust air channel arrangement
2 sheet metal pipe
3 supporting structure
4 wall portion
5 contact portion
6 further wall portion
7 Z-shaped portion
8 connection profile side
9 central web
10 end
111 interspace
12 front side
13 cutting edge
14 mounting sealing
15 sealing lip
A distance
X longitudinal direction

The invention claimed is:

1. An exhaust air channel arrangement for a kitchen exhaust air channel system, wherein the exhaust air channel arrangement is composed of a sheet metal pipe and a supporting structure, which is movably received within the sheet metal pipe along the longitudinal direction (x) of the sheet metal pipe, wherein both opposed wall portions of the sheet metal pipe are mutually supported by the supporting structures; wherein the supporting structure is a formed integral sheet metal stripe.

2. The exhaust air channel arrangement of claim 1, wherein the supporting structure has a first and second contact portion, which respectively contact, through a form-fit, an inner circumference of the sheet metal pipe.

3. The exhaust air channel arrangement of claim 2, wherein the first and second contact portion respectively have a C-shape, wherein both contact portions contact two further opposed wall portions on the inner circumference of the sheet metal pipe.

4. The exhaust air channel arrangement of claim 2, wherein the contact portions are connected to each other by a Z-shaped portion wherein the Z-shaped portion has a first and second connection profile side, wherein the first connection profile side is joined to the first contact portion and the second connection profile side is joined to the second contact portion.

5. The exhaust air channel arrangement of claim 4, wherein the connection profile sides contact at least in portions two opposed wall portions of the sheet metal pipe and extend at least in portions in parallel to these wall portions.

6. The exhaust air channel arrangement of claim 4, wherein the Z-shaped portion has a central web, through which the first and second connection profile side are connected on opposed ends of the central web under a respective right angle.

7. The exhaust air channel arrangement of claim 4, wherein the Z-shaped portion has a central web, which extends perpendicularly to the opposed wall portions of the sheet metal pipe and reaches the latter, so that the opposed wall portions (4) of sheet metal pipe are mutually supported through the central web.

8. The exhaust air channel arrangement of claim 1, wherein the sheet metal pipe is a flat channel with a rectangular cross-section that comprises a first pair of parallel separated wall portions and a second pair of parallel separated wall portions, the second pair of wall portions extending perpendicularly to the first pair of wall portions.

9. The exhaust air channel arrangement of claim 1, wherein a first and second of the supporting structure are arranged inside the sheet metal pipe at a distance (A) from each other, wherein through the first and second supporting structure the pipe cross-section is subdivided, respectively, into a first partial cross-section and a second partial cross-section, fluidically separated from the first, and wherein in an interspace between both supporting structures the pipe cross-section is unitary.

10. The exhaust air channel arrangement of claim 1, wherein the supporting structure is received, by mechanical preload, inside the sheet metal pipe, which is directed in parallel to both opposed and mutually supported wall portions and perpendicularly to the longitudinal direction (x) of the sheet metal pipe.

11. The exhaust air channel arrangement of claim 1, wherein the supporting structure has a smooth surface on its outer circumference, at least where its outer circumference contacts the inner circumference of the sheet metal pipe.

12. The exhaust air channel arrangement of claim 1, which is cast within the screed of a floor, wherein a central web of the supporting structure, which supports the opposed wall portions of sheet metal pipe against each other, is perpendicular to a tread surface of the floor.

13. The exhaust air channel arrangement of claim 1, wherein the sheet metal pipe is made of a thin metal sheet, which has a sheet thickness of less than 0.5 mm.

14. The exhaust air channel arrangement of claim 1, wherein the sheet metal pipe is made of a thin metal sheet, which has a sheet thickness of less than 0.4 mm.

15. The exhaust air channel arrangement of claim 1, wherein the sheet metal pipe is made of a thin metal sheet, which has a sheet thickness of less than 0.3 mm.

16. The exhaust air channel arrangement of claim 13, wherein the sheet metal pipe is provided, on the front side of at least one of its opposed ends with a sharp cutting edge, which is covered by a mounting sealing, which is inserted over the sharp cutting edge on the at least one end of the sheet metal pipe.

17. An exhaust air channel arrangement for a kitchen exhaust air channel system, wherein the exhaust air channel arrangement is composed of a sheet metal pipe and a supporting structure, which is movably received within the sheet metal pipe along the longitudinal direction (x) of the sheet metal pipe, wherein both opposed wall portions of the sheet metal pipe are mutually supported by the supporting structure, wherein the supporting structure has a first and second contact portion, which respectively contact, through a form-fit, an inner circumference of the sheet metal pipe, and wherein the contact portions are connected to each other by a Z-shaped portion wherein the Z-shaped portion has a first and second connection profile side, wherein the first connection profile side is joined to the first contact portion and the second connection profile side is joined to the second contact portion.

18. An exhaust air channel arrangement for a kitchen exhaust air channel system, wherein the exhaust air channel arrangement is composed of a sheet metal pipe and a supporting structure, which is movably received within the sheet metal pipe along the longitudinal direction (x) of the sheet metal pipe, wherein both opposed wall portions of the sheet metal pipe are mutually supported by the supporting structure, wherein the supporting structure is comprised of a first and second supporting structure that are arranged inside the sheet metal pipe at a distance (A) from each other, wherein through the first and second supporting structure the pipe cross-section is subdivided, respectively, into a first partial cross-section and a second partial cross-section, fluidically separated from the first, and wherein in an interspace between both supporting structures the pipe cross-section is unitary.

19. An exhaust air channel arrangement for a kitchen exhaust air channel system, wherein the exhaust air channel arrangement is composed of a sheet metal pipe and a supporting structure, which is movably received within the sheet metal pipe along the longitudinal direction (x) of the sheet metal pipe, wherein both opposed wall portions of the sheet metal pipe are mutually supported by the supporting structure, wherein the supporting structure is received, by mechanical preload, inside the sheet metal pipe, which is directed in parallel to both opposed and mutually supported wall portions and perpendicularly to the longitudinal direction (x) of the sheet metal pipe.

20. An exhaust air channel arrangement for a kitchen exhaust air channel system, wherein the exhaust air channel arrangement is composed of a sheet metal pipe and a supporting structure, which is movably received within the sheet metal pipe along the longitudinal direction (x) of the sheet metal pipe, wherein both opposed wall portions of the sheet metal pipe are mutually supported by the supporting structure, the exhaust air channel arrangement being cast within the screed of a floor, wherein a central web of the supporting structure, which supports the opposed wall portions of sheet metal pipe against each other, is perpendicular to a tread surface of the floor.

* * * * *